United States Patent [19]

Summer

[11] Patent Number: 5,626,928
[45] Date of Patent: May 6, 1997

[54] ADHESIVE IN THE FORM OF A FILM

[75] Inventor: David C. Summer, Nr. Pickering, United Kingdom

[73] Assignee: R.A. Adhesive Products Limited, West Midlands, United Kingdom

[21] Appl. No.: 391,636

[22] Filed: Feb. 21, 1995

Related U.S. Application Data

[63] Continuation of Ser. No. 39,032, filed as PCT/GB91/01626, Sep. 23, 1991 published as WO92/07041, Apr. 30, 1992, abandoned.

[30] Foreign Application Priority Data

Oct. 11, 1990 [GB] United Kingdom ............ 9022129

[51] Int. Cl.$^6$ ........................................ B32B 7/00
[52] U.S. Cl. ................. 428/41.8; 428/41.7; 428/41.9; 428/43; 428/137; 428/245; 428/247; 428/255; 428/261; 428/343; 428/352
[58] Field of Search .................... 428/40, 43, 131, 428/137, 245, 247, 255, 261, 343, 352, 41.7, 41.8, 41.9

[56] References Cited

U.S. PATENT DOCUMENTS

| 3,096,202 | 7/1963 | De Groot Von Arx | 117/68.5 |
|---|---|---|---|
| 3,853,598 | 12/1974 | Raguse | 117/76 A |
| 4,581,087 | 4/1986 | Johnson | 156/209 |
| 5,397,625 | 3/1995 | Osteen et al. | 428/224 |
| 5,403,300 | 4/1995 | Howarth | 604/384 |
| 5,435,457 | 7/1995 | Tiner et al. | 220/485 |

FOREIGN PATENT DOCUMENTS

| 3217801 | 11/1983 | Germany. |
|---|---|---|
| 417825 | 2/1967 | Switzerland. |
| 922350 | 3/1963 | United Kingdom. |
| 1331354 | 9/1973 | United Kingdom. |
| 1365934 | 9/1974 | United Kingdom. |
| 1429451 | 3/1976 | United Kingdom. |
| 1449795 | 9/1976 | United Kingdom. |
| 2082969 | 3/1982 | United Kingdom. |
| 2198061 | 6/1988 | United Kingdom. |
| 2214450 | 9/1989 | United Kingdom. |
| 89-09129 | 10/1989 | WIPO. |

OTHER PUBLICATIONS

Advertising material–CELLUX. Place and date of publication unknown.
Advertising material–ATG System. Published in the United Kingdom, date unknown.
WO 89/09129, PCT International Application published Oct. 1989.

*Primary Examiner*—Patrick Ryan
*Assistant Examiner*—Marie R. Yamnitzky
*Attorney, Agent, or Firm*—Smith-Hill and Bedell

[57] ABSTRACT

An adhesive structure comprises a film of adhesive, and support material embedded in the adhesive film. The adhesive material and the support material have a tensile strength in combination which is sufficiently low to allow the adhesive film and the support material to be broken together, in use, by applying a longitudinal force against the resistance provided by the adhesion of the film to an article. The support material has a regular structure which defines lines of relative weakness along which the support material will preferentially break. The support material has a tensile strength which is sufficiently high to prevent the adhesive film from stretching. Thus, the adhesive film and support material will, in use, break together along a weakness line in the support material, but without stretching.

9 Claims, 1 Drawing Sheet

ADHESIVE IN THE FORM OF A FILM

This is a continuation of application Ser. No. 08/039,032, filed as PCT/GB91/01626, Sep. 23, 1991 published as WO92/07041, Apr. 30, 1992, and now abandoned.

The present invention relates to adhesives and especially to the class of adhesives commonly called "transfer adhesives".

A transfer adhesive is a film of adhesive (which may incorporate random fibres as a filler) which is stored as a coating on a release paper. When placed in contact with another article, the film will preferentially adhere to the article, allowing the release paper to be removed to leave the adhesive film on the article. The tensile strength of the film is sufficiently low to allow the film to be broken by applying a longitudinal force to the film against the resistance provided by the adhesion of the film to an article. Conventionally, transfer adhesives are supplied in rolls in which adhesive film is coiled between release paper. The transfer adhesive can be applied to an article by uncoiling the adhesive film and release paper to adhere the adhesive film to the article. The release paper is peeled from the film, either simultaneously or subsequently, to leave the film on the article. Application can be performed by hand, or by using a hand-held applicator gun which contains a coil of adhesive and release paper. A trigger, when depressed allows the adhesive film to be drawn freely from the gun as the gun is drawn across the article. The release paper is automatically removed from the adhesive film within the gun, and stored for subsequent disposal. If the trigger is released, no further adhesive film can leave the gun. Consequently, further movement of the gun across the article applies a force along the length of the adhesive film against the resistance provided by the adhesion of the film to the article, until the film breaks.

A significant disadvantage with this arrangement is that the adhesive film breaks unpredictably, so that a neat end to the adhesive film on the article is rarely produced. Furthermore, many adhesives suitable for use as transfer adhesives tend to "string", by stretching into fine strands of very great length before breaking at an unpredictable point. Thus, in addition to a ragged edge to the adhesive film, there may be strings of adhesive which are unsightly and may attract dirt or become adhered to other parts of the article or other articles.

It is an object of the present invention to obviate or mitigate these and other disadvantages of known transfer adhesives.

The invention provides an adhesive structure comprising a film of adhesive and support material embedded in the adhesive film, the support material having a regular structure which defines lines of relative weakness along which the support material will preferentially break, the tensile strength of the adhesive film and the support material in combination being sufficiently low and the tensile strength of the support material alone being sufficiently high so that when the adhesive film and the support material are broken together, in use, by applying a longitudinal force against resistance provided by the adhesion of the film to an article, the support material prevents the adhesive film stretching, whereby the adhesive film and support material will, in use, break together along a weakness line defined in the support material.

Preferably the support material is an elongate strip, and the weakness lines run across the strip. The weakness lines may run generally transversely. The support material is preferably sufficiently strong to allow the strip to be longitudinally cut and separated without transverse stretching of the adhesive film.

The support material is preferably a perforate structure, providing weakness lines along lines of perforations. The support material may be a net or net-like perforate structure. The support material may be a net of synthetic plastics material. The synthetic plastics material may comprise polyethylene, polystyrene or a combination thereof.

The adhesive is preferably thermoplastic rubber resin adhesive, a solvent-based rubber adhesive or an acrylic polymer based adhesive.

Preferably the structure further comprises a release paper on which the adhesive film and support material form a coating, for storage before use.

One embodiment of the present invention will now be described in more detail, by way of example only, and with reference to the accompanying drawings, in which.

Figure 1:
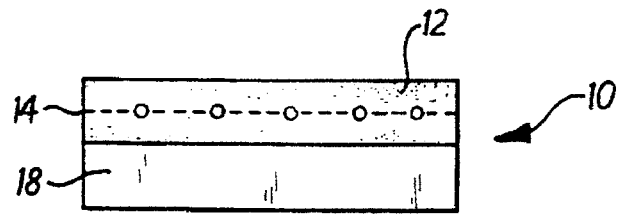
FIG. 1 is a schematic transverse section through a structure according to the present invention for use as a transfer adhesive.

Turning to FIG. 1 there is shown an adhesive structure 10 comprising a film 12 of adhesive, and support material 14 embedded in the adhesive film 12. As will be described, the adhesive material and the support material have a tensile strength in combination which is sufficiently low to allow the adhesive film and the support material to be broken together, in use, by applying a longitudinal force against the resistance provided by the adhesion of the film to an article. The support material 14 has a regular structure shown in FIG. 2, which defines lines 16 of relative weakness along which the support material 14 will preferentially break. The support material 14 has a tensile strength which is sufficiently high to prevent the adhesive film 12 from stretching. Thus, as will be described, the adhesive film 12 and support material 14 will, in use, break together along a weakness line 16 in the support material 14.

In more detail, FIG. 1 shows a film 12 of adhesive formed as strip along a release paper 18, such as a silicone paper. The adhesive may be a thermoplastic (hot-melt) rubber resin adhesive, a solvent-based resin adhesive or an acrylic polymer based adhesive. A support material 14 in the form of synthetic plastics net, is embedded in the film 12. This may conveniently be achieved by applying two layers of adhesive to opposite faces of the net, thereby embedding the net. For some applications, it may be appropriate to embed the net between two layers of different adhesives, such as adhesives with different adhesion properties. This allows the structure to perform a "differential" adhesive function, adhering more strongly on one face than on the other.

Figure 2:
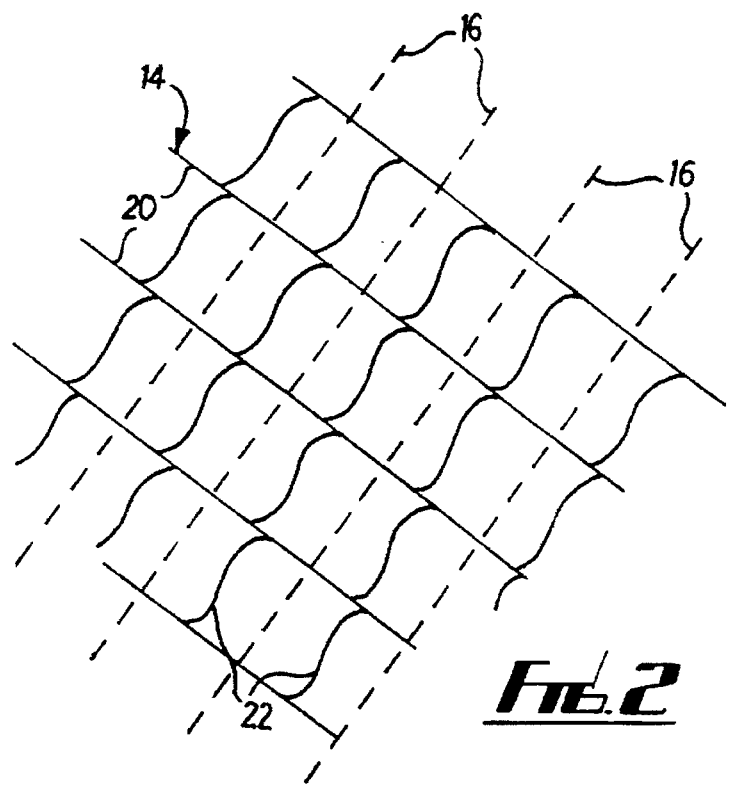
FIG. 2 is a highly schematic partial perspective view of a support material for use in the structure of FIG. 1.

The net is shown more clearly in FIG. 2. The net consists of "warp" portions 20 which run longitudinally along the strip of the adhesive film 12, and "weft" portions 22 which extend between adjacent warps 20. Although the terms warp and weft are used, the material is not necessarily woven. A suitable material for the net 14 is Net 909 manufactured by Smith and Nephew Plastics Ltd. This is a mixture of polystyrene and polyethylene. The net is created by extruding a thin polymer film which is embossed to create openings which are then burst open more widely by stretching the material. The nature of the stretching operation produces local differences in the orientation of wefts, as can be seen from FIG. 2, but the embossing provides an overall regularity to the structure which gives rise to substantially regularly spaced lines of weakness 16 running between wefts, transverse to the warps. If tensile forces beyond the breaking point are applied to the material 14 along the warps 20, the material 14 will fail by breaking or tearing along a weakness line 16.

Figure 3:
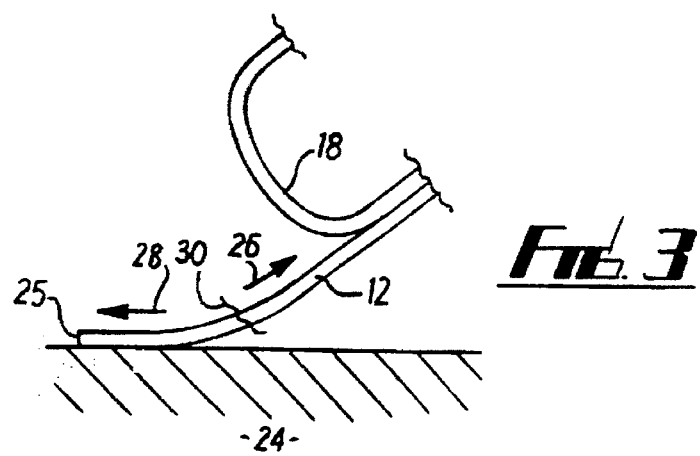
FIG. 3 is a side view of the structure of FIG. 1 during use.

FIG. 3 indicates how the transfer adhesive structure described above can be used. In order to apply an adhesive strip to an article 24, the end 25 of the film 12 (containing the support material 14) is brought into contact with the article 24 and the film 12 is then laid along the article 24 for instance by using an applicator gun of the type described above and in the manner described above. In laying the film 12, the release paper 18 is removed. When sufficient strip has been laid on the article 24, a force is applied along the film 12 and support material 14 in the direction of the arrow 26. This force is resisted by the adhesion of the film 12 to the article 24, as indicated by the arrow 28. The properties of the materials are chosen to allow the adhesive resistance 28 to resist forces at least as great as the breaking force of the adhesive 12 and support material 14 in combination. Thus when the force 26 reaches the breaking force, the support material 14 will break, generally transverse of the strip along a line defined by the weakness lines 16. This leaves a neat end to the strip at 30. When the film 12 and support material 14 break, the adhesive film 12 is prevented from stretching or stringing by the tensile strength of the material 14. Thus, until the support material breaks, the adhesive film 12 is prevented from stretching. When the support material 14 breaks, the break will take place quickly and neatly, breaking the adhesive film at the same time. The adhesive film around the break remains attached to the support material, and therefore cannot stretch or string. It may be difficult to predict precisely which line 16 will break, and sometimes a break will migrate to a neighbouring line 16, but materials such as those described above provide weakness lines every few millimeters, or less, so that the result is a neater, more accurate end to the strip than has hitherto been possible, and which is transverse or nearly transverse across the strip.

The structure of FIG. 1 would normally be used when the article to which the film 12 is applied is immediately to be stuck to another article. Alternatively, the release paper 18 may extend beyond the edges of the adhesive, to allow the resulting structure to be used as a finger-lift tape, in which the release paper 18 is removed by hand.

Strips of adhesive as described above may be manufactured by forming wide rolls of adhesive on release paper, using large sheets of support material and large areas of adhesive. The rolls are subsequently cut transversely to produce a number of rolls of relatively narrow adhesive strips. Consequently, it is desirable that the support material has sufficient strength, transverse to the final strip, to prevent the adhesive stretching as the cut narrow rolls are separated.

It will be apparent that many variations and modifications can be made to the structures described above, without departing from the scope of the present invention. In particular, various materials could be used as support materials, and a wide range of adhesive materials could be used, so long as the particular combination meets the requirements which have been described.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An article of manufacture comprising:
   a transfer adhesive structure having first and second opposite faces and comprising a film of adhesive and support material embedded in the adhesive film, the adhesive film being exposed at both said first and second faces, and
   a release paper on which the adhesive film and support material form a coating, for storage before use,
   the support material comprising a net which defines regularly spaced lines along which the support material is weak relative to the remainder of the support material and along which the support material will preferentially break, and wherein the transfer adhesive structure may be broken after removal of the release paper by applying a longitudinal force against resistance provided by adhesion of the film to an article, and wherein adhesion of the film to the support material in the region of a break supports the film against stretching, whereby the adhesive film and support material will, in use, break together along a weakness line defined in the support material.

2. An article according to claim 1, wherein the transfer adhesive structure is in the form of a strip and wherein adhesion of the adhesive film with the support material allows the strip to be longitudinally cut and separated without transverse stretching of the adhesive film.

3. An article according to claim 1, wherein the adhesive film is thermoplastic rubber resin adhesive, a solvent-based rubber adhesive, or an acrylic polymer based adhesive.

4. An article according to claim 1, wherein the transfer adhesive structure comprises two layers of adhesive material with the net therebetween.

5. An article of manufacture comprising:
   a transfer adhesive structure having first and second opposite faces and comprising a film of adhesive and support material embedded in the adhesive film, the adhesive film being exposed at both said first and second faces, and
   a release paper on which the adhesive film and support material form a coating, for storage before use,
   wherein the support material is a net of synthetic plastics material which defines regularly spaced lines along which the support material is weak relative to the remainder of the support material and along which the support material will preferentially break, and wherein the transfer adhesive structure may be broken after removal of the release paper by applying a longitudinal force against resistance provided by adhesion of the film to an article, and wherein adhesion of the film to the support material in the region of a break supports the film against stretching, whereby the adhesive film and support material will, in use, break together along a weakness line defined in the support material.

6. An article according to claim 5, wherein the synthetic plastics material comprises polyethylene, polystyrene, or a combination thereof.

7. An article according to claim 5, wherein the transfer adhesive structure is in the form of a strip and wherein adhesion of the adhesive film with the support material allows the strip to be longitudinally cut and separated without transverse stretching of the adhesive film.

8. An article according to claim 5, wherein the adhesive film is thermoplastic rubber resin adhesive, a solvent-based rubber adhesive, or an acrylic polymer based adhesive.

9. An article according to claim 5, wherein the transfer adhesive structure comprises two layers of adhesive material with the net therebetween.

* * * * *